US011505212B2

(12) United States Patent
Fukunaga et al.

(10) Patent No.: US 11,505,212 B2
(45) Date of Patent: Nov. 22, 2022

(54) VEHICLE MANAGEMENT SYSTEM

(71) Applicant: TOYOTA JIDOSHA KABUSHIKI KAISHA, Aichi-ken (JP)

(72) Inventors: Keima Fukunaga, Tokyo (JP); Tomohito Matsuoka, Nagoya (JP); Seiichi Tsunoda, Nisshin (JP); Jiro Goto, Seto (JP); Yasutaka Etou, Okazaki (JP); Terumi Ukai, Toyokawa (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 244 days.

(21) Appl. No.: 17/003,995

(22) Filed: Aug. 27, 2020

(65) Prior Publication Data

US 2021/0114623 A1    Apr. 22, 2021

(30) Foreign Application Priority Data

Oct. 16, 2019  (JP) .............................. JP2019-189287

(51) Int. Cl.
| | |
|---|---|
| *B60W 60/00* | (2020.01) |
| *G06Q 10/08* | (2012.01) |
| *G08G 1/01* | (2006.01) |
| *B60W 50/14* | (2020.01) |
| *B60W 30/09* | (2012.01) |

(52) U.S. Cl.
CPC ........ *B60W 60/0016* (2020.02); *B60W 30/09* (2013.01); *B60W 50/14* (2013.01); *G06Q 10/083* (2013.01); *G08G 1/012* (2013.01); *B60W 2050/146* (2013.01); *B60W 2756/10* (2020.02)

(58) Field of Classification Search
CPC .. B60W 60/0016; B60W 30/09; B60W 50/14; B60W 2756/10; B60W 2050/146; G08G 1/012
USPC ........................................................ 701/117
See application file for complete search history.

(56) References Cited

U.S. PATENT DOCUMENTS

| | | | |
|---|---|---|---|
| 10,997,430 B1 * | 5/2021 | Slavin ..................... | H04W 4/38 |
| 11,094,195 B2 * | 8/2021 | Corbacio .......... | B60W 30/0953 |
| 11,144,868 B1 * | 10/2021 | McBride ............ | G06Q 10/0833 |
| 2004/0263357 A1 * | 12/2004 | Hamilton ................. | G08G 1/01 |
| | | | 340/936 |

(Continued)

FOREIGN PATENT DOCUMENTS

| | | | | |
|---|---|---|---|---|
| CA | 2956611 A1 | * | 9/2017 | |
| CN | 105243838 A | * | 1/2016 | ......... G06K 9/00832 |

(Continued)

OTHER PUBLICATIONS

Wuhong et al.."Computer Aided Dependability Analysis of Vehicle Operation Based on Priority and Event Sequencing," 2003, vol. 2, Publisher: IEEE.*

*Primary Examiner* — Tuan C To
(74) *Attorney, Agent, or Firm* — Hauptman Ham, LLP

(57) ABSTRACT

Provided is a vehicle management system including a plurality of vehicles that execute different functions, and an event information server that transmits event occurrence information. The vehicles execute the same function corresponding to the event occurrence information, when a priority of a function corresponding to the event occurrence information received from the event information server is higher than a priority of a function currently being executed.

4 Claims, 8 Drawing Sheets

(56) References Cited

U.S. PATENT DOCUMENTS

| | | | |
|---|---|---|---|
| 2014/0372015 A1* | 12/2014 | Namm | G01C 21/3438 |
| | | | 701/117 |
| 2016/0360503 A1* | 12/2016 | Rauenbuehler | H04W 68/02 |
| 2018/0096595 A1* | 4/2018 | Janzen | G08G 1/04 |
| 2018/0165782 A1 | 6/2018 | Ibe | |
| 2019/0139417 A1 | 5/2019 | Kline et al. | |
| 2019/0206245 A1* | 7/2019 | Royal | G08G 1/081 |
| 2020/0079387 A1* | 3/2020 | A G | G06T 7/80 |
| 2020/0082723 A1* | 3/2020 | Corbacio | G08G 1/0965 |
| 2020/0168094 A1 | 5/2020 | Shimodaira et al. | |
| 2020/0364951 A1* | 11/2020 | Riley | G08G 1/096758 |
| 2021/0392082 A1* | 12/2021 | Perocchio | H04L 47/82 |

FOREIGN PATENT DOCUMENTS

| | | |
|---|---|---|
| CN | 109949576 A | 6/2019 |
| JP | 6455985 B2 | 1/2019 |
| WO | WO-2017165939 A1 * | 10/2017 |
| WO | 2019017253 A1 | 1/2019 |

* cited by examiner

VEHICLE MANAGEMENT SYSTEM

CROSS REFERENCE TO RELATED APPLICATION

This application claims priority to Japanese Patent Application No. 2019-189287 filed on Oct. 16, 2019, which is incorporated herein by reference in its entirety including the specification, claims, drawings, and abstract.

TECHNICAL FIELD

The present disclosure generally relates to a vehicle management system that manages a plurality of vehicles executing different functions.

BACKGROUND

Recently, autonomous driving technology has been improved, and there have been proposed various systems using vehicles that can be driven autonomously. For example, there is proposed a delivery system configured with: a small autonomous delivery vehicle on which a delivery box is loaded; and a large autonomous delivery vehicle that travels with the small delivery vehicle loaded thereon (for example, see JP 6455985 B).

SUMMARY

In cities, various events such as traffic accidents and fire occur. However, even if such an event occurs, no traffic regulation is set around the site of such event until police officers or firefighters arrive, so that there is a risk of causing a secondary accident. By the use of the delivery system disclosed in JP 6455985 B, a large number of autonomous vehicles are to be traveling in cities. However, since those vehicles cannot execute functions other than delivery, they are difficult to apply to dealing with occurrence of such events.

It is an advantage of the present disclosure to provide a vehicle management system capable of allowing a plurality of vehicles to execute the same event dealing function instantly upon occurrence of an event.

The vehicle management system of the present disclosure includes: a plurality of vehicles that execute different functions; and an event information server that transmits event occurrence information, wherein each of the vehicles executes the same function corresponding to the event occurrence information, when a priority of a function corresponding to the event occurrence information received from the event information server is higher than a priority of each function currently being executed.

As described, when the priority of the function corresponding to the event occurrence information is higher than the priority of each function being executed by each of the vehicles, each of the vehicles executes the same function corresponding to the event occurrence information. Therefore, upon occurrence of an event such as a traffic accident, it is possible to instantly deal with such event.

In the vehicle management system of the present disclosure, when the event occurrence information received from the event information server is accident occurrence information, each of the vehicles may autonomously travel based on the accident occurrence information and form a regulation line around a site of an accident.

Since the regulation line may be formed instantly with the plurality of vehicles when an accident occurs, occurrence of secondary accidents may be suppressed.

The vehicle management system of the present disclosure may include a common server that includes a map information database, wherein: the plurality of vehicles may autonomously travel while communicating with the common server; the common server may output an event dealing function execution command to execute a function corresponding to the event occurrence information to a group of the vehicles whose currently executing function is lower in priority than the function corresponding to the event occurrence information received from the event information server; and upon receiving the event dealing function execution command from the common server, the group of the vehicles may execute the function corresponding to the event occurrence information based on map information and the event occurrence information received from the common server.

Since each of the vehicles executes the function corresponding to the event occurrence information based on the information from the common server including the map information database, a more complicated function may be executed.

In the vehicle management system of the present disclosure:
when the event occurrence information received from the event information server is accident occurrence information, the common server may output the event dealing function execution command to execute a function corresponding to the accident occurrence information to a group of the vehicles; and upon receiving the event dealing function execution command from the common server, the group of vehicles may autonomously travel based on the map information and the event occurrence information received from the common server and form a regulation line around a site of an accident.

Since the regulation line may be formed instantly with the plurality of vehicles based on the information from the common server when an accident occurs, occurrence of secondary accidents may be suppressed.

In the vehicle management system of the present disclosure, the plurality of vehicles may stop around the site of the accident to form the regulation line. Further, in the vehicle management system of the present disclosure, each of the plurality of vehicles may include a display on an outer face; and a sign indicating that it is a regulated area may be displayed on each of the displays.

Thereby, the site of the accident may be regulated more effectively.

The vehicle management system of the present disclosure is capable of executing the same event dealing function with the plurality of vehicles instantly upon the occurrence of events.

BRIEF DESCRIPTION OF DRAWINGS

An embodiment of the present disclosure will be described based on the following figures, wherein.

DESCRIPTION OF EMBODIMENT

Figure 1:
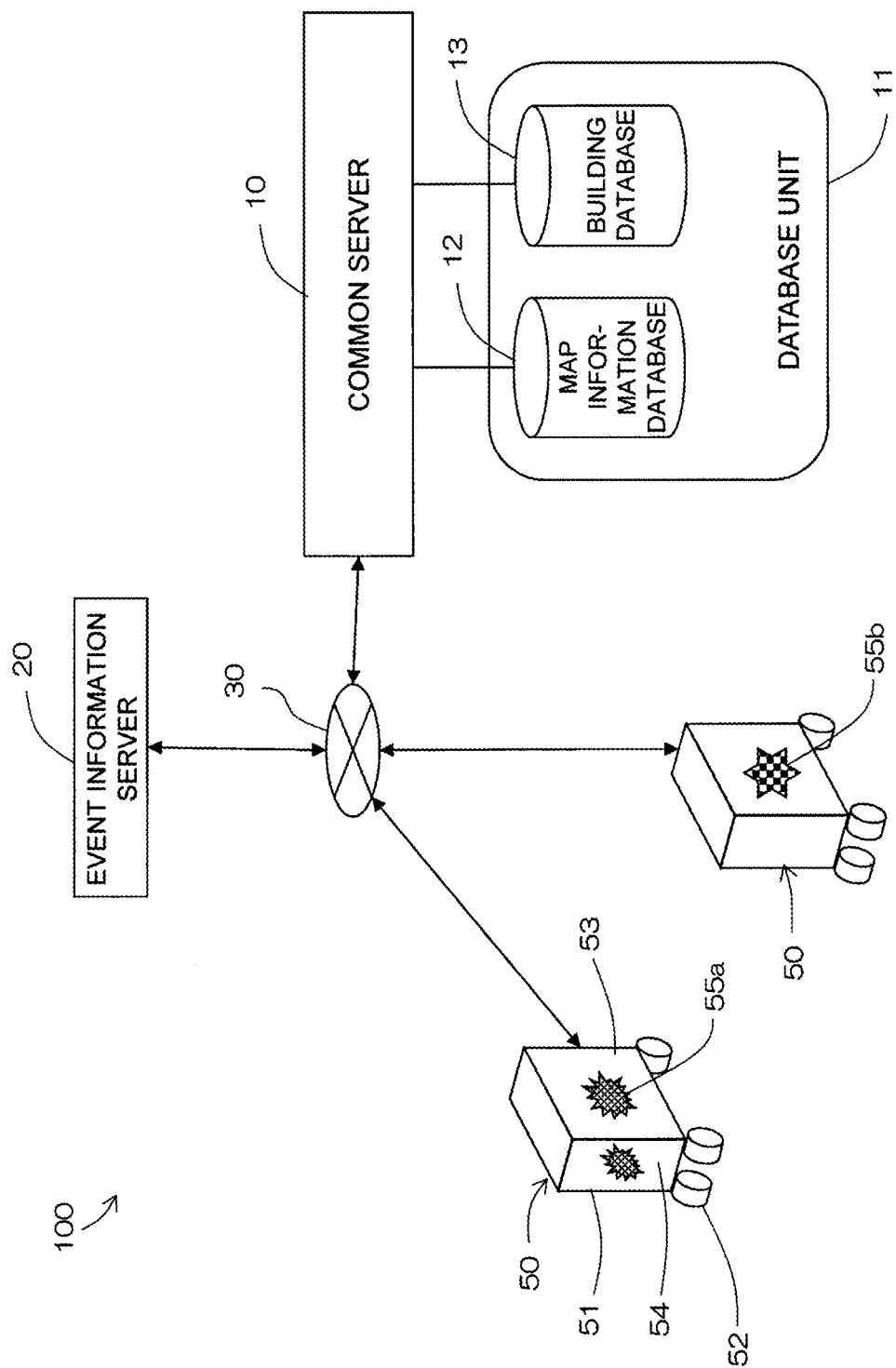
FIG. 1 is a flow diagram showing a configuration of a vehicle management system according to an embodiment.

Hereinafter, a vehicle management system 100 according to an embodiment will be described by referring to the accompanying drawings. As shown in FIG. 1, the vehicle management system 100 is configured with a common server 10, a plurality of vehicles 50, and an event information server 20. In the explanation below, it is described that the plurality of vehicles 50 are to execute a delivery function or a housework service function in cooperation with the common server 10 when there is no occurrence of an event. However, functions other than those may also be executed when no event occurs.

The common server 10 is a computer that includes inside thereof a memory and a processor such as a CPU that performs information processing. A database unit 11 including a map information database 12 and a building database 13 is connected to the common server 10. The map information database 12 stores map data such as layout and the like of roads and buildings of a regional area where the plurality of vehicles 50 travel. The building database 13 stores therein data of the buildings, such as layout of floors, layout of lifting facilities such as elevators and escalators, layout of furniture, partitions, and the like of each floor of the buildings in the regional area where the vehicles 50 travel. The building database 13 may be a combination of data of BIM (Building Information Modeling) of each of the buildings and scan data acquired by scanning the inside of each building. Hereinafter, the regional area where the plurality of vehicles 50 travel and execute the delivery function and the housework service function while communicating with the common server 10 will be referred to as a management area of the common server 10.

The event information server 20 is connected to data communication systems of a fire department, the police, a local government, the meteorological agency, a gas company, an electrical manufacturing company, a security company, and the like; acquires event occurrence information such as a traffic accident, fire, a power failure, a gas leak, and the like occurring in the management area; and sends the event occurrence information acquired via the Internet 30 to the common server 10 or the vehicles 50.

In FIG. 1, the vehicle 50 is an electric vehicle that executes the delivery function for delivering a parcel received from a user 31 and delivering it to another user 32 or executes the housework service function such as picking up a designated person, going shopping, and the like under a normal state where there is no occurrence of event. The vehicle 50 includes a main body 51 and drive wheels 52 driven by a motor, and travels autonomously. Housed in the main body 51 are: a parcel reception unit for keeping the parcel; a battery for driving the drive wheels 52; a power control apparatus; a communication unit that exchanges information with the common server 10 or the event information server 20; and a travel control unit that controls the vehicle 50 to travel autonomously based on the information received from the common server 10 or the event information server 20. The travel control unit is configured with a computer that includes therein a memory and a processor such as a CPU that performs information processing. The main body 51 includes a display on side faces 53 and front and rear faces 54 as outer faces. Therefore, when executing the delivery function or the housework service function, it is possible to display a logotype 55a of the carrier, a logotype 55b of the housework service company, or the like, and to display advertisements.

Figure 2:
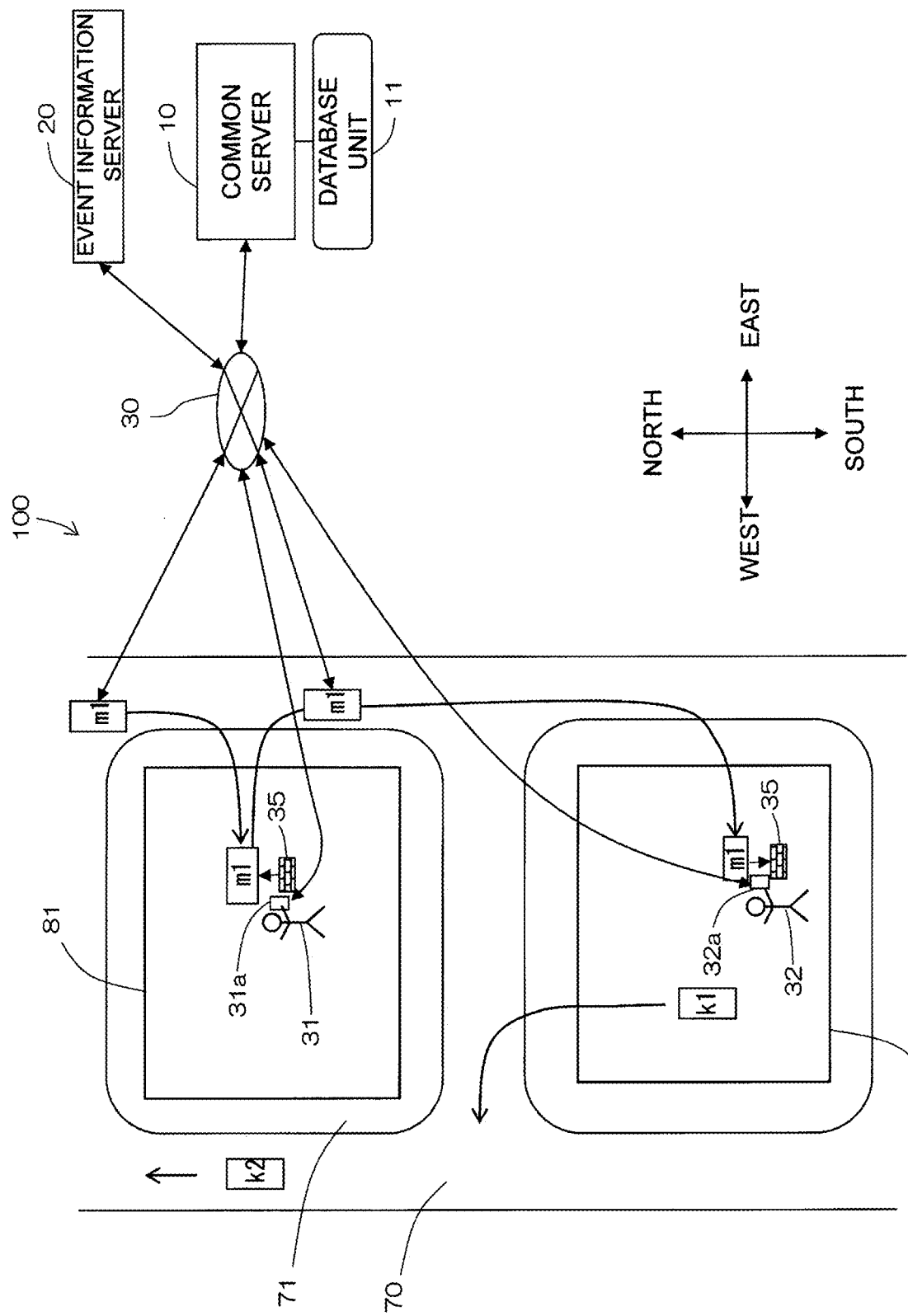
FIG. 2 is a top plan view of the vehicle management system according to the embodiment in a state where vehicles are executing a delivery function and a housework service function.
Figure 6:
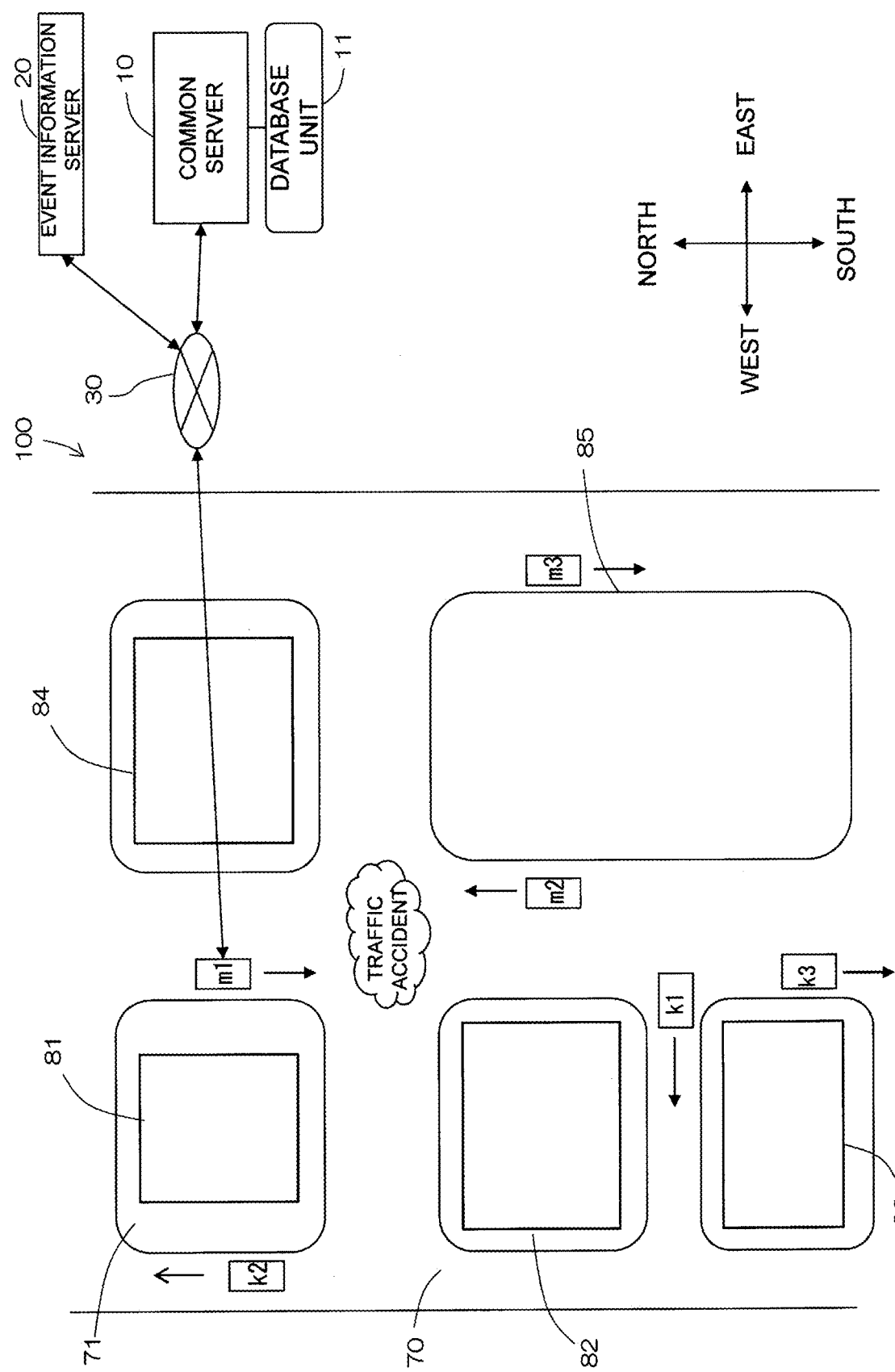
FIG. 6 is a top plan view showing positions of the vehicles of the vehicle management system shown in FIG. 1 immediately after occurrence of an event.

Next, the delivery function and the housework service function executed by the vehicle 50 under a normal state where no event occurs will be simply described by referring to FIG. 2. In the explanation of FIG. 2 and FIG. 6, the plurality of vehicles 50 that execute the delivery function are expressed as m1 to m3, and the plurality of vehicles 50 that execute the housework service function are expressed as k1 to k3. Note that the number of vehicles 50 is not limited thereto, but there may be a larger number of vehicles. Further, in the explanation, it is assumed that the upper side of the paper when facing the drawing is the north, the lower side thereof is the south, the right side thereof is the east, and the left side thereof is the west.

In the management area of the common server 10 where the plurality of vehicles m1 to m3 execute the delivery function, there are a plurality of buildings 81 and 82. In the surroundings of each of the buildings 81 and 82, a roadway 70 and a sidewalk 71 are provided. Upon receiving a pickup-and-delivery request for a parcel 35 from the user 31 in the building 81 for the user 32 in the building 82, the common server 10 searches for the vehicle located near the user 31 based on positional information transmitted from a mobile terminal 31a of the user 31. Then, as shown in FIG. 2, a pickup-and-delivery command is transmitted to the vehicle m1 that is traveling on the roadway 70 very close to the building 81. Further, simultaneously, the common server 10 transmits, to the vehicle m1, current positional information of the user 31, the positional information of the user 31 in the building 81, map information of the surroundings of the building 81, and inside structure data of the building 81. Further, the common server 10 transmits delivery destination information to the vehicle m1.

The vehicle m1 calculates a traveling route to the user 31 based on the data received from the common server 10, and autonomously travels to the user 31 along the calculated traveling route. When the vehicle m1 arrives at the user 31, the user 31 places the parcel 35 to be loaded on the vehicle m1. Upon confirming that the parcel 35 is loaded, the vehicle m1 starts to autonomously travel toward the delivery destination. Then, as shown in FIG. 2, the vehicle m1 exits from the building 81 and travels on the roadway 70 toward the building 82. At this time, the vehicle m1 receives inside structure data of the building 82 from the common server 10. Then, the vehicle m1 enters the building 82, and continues to autonomously travel toward the user 32 in the building 82 while receiving the positional information of a mobile terminal 32a of the user 32. After delivering the parcel 35 to the user 32, the vehicle m1 autonomously travels toward the next user. The vehicles m2, m3 also execute the delivery function in the same manner as that of the vehicle m1.

Further, upon receiving a housework service request such as picking up a child to and from school or going shopping from the users 31, 32, for example, the common server 10 sends a picking-up execution command and a shopping execution command to the vehicles k1, k2 located in the vicinity of the users 31, 32. Further, simultaneously, the common server 10 transmits, to the vehicles k1, k2, positional information of the users 31, 32, inside information of the buildings 81, 82, and positional information of the pickup destination and the shopping destination. The vehicles k1, k2 execute the housework service function such as picking up the child and going shopping based on such information transmitted from the common server 10.

Next, operations of the plurality of vehicles 50 when an event occurs will be described by referring to FIG. 3 and FIG. 6 to FIG. 8.

As shown in FIG. 6, in the management area, there are buildings 81 to 84, and the sidewalk 71 is placed in the surroundings of each of the buildings 81 to 84. Further, the roadway 70 runs between the buildings 81 to 84. Further, there is a park 85 on the east side of the buildings 82, 82 with the roadway 70 interposed therebetween.

Figure 3:
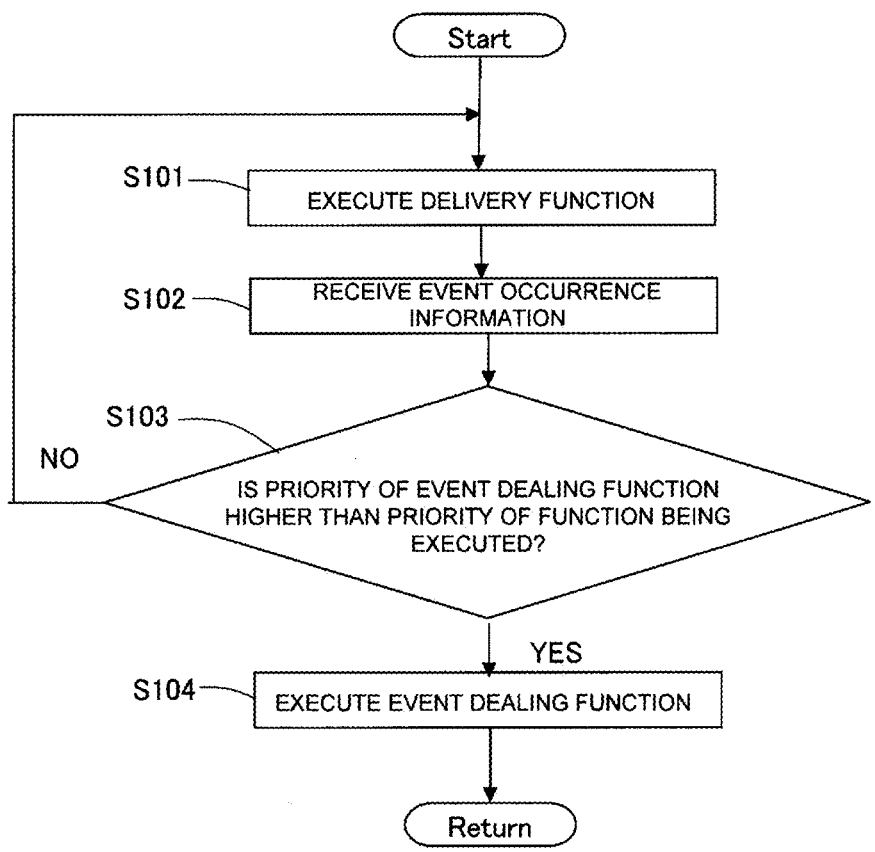
FIG. 3 is a flowchart showing operations of a vehicle of the vehicle management system according to the embodiment shown in FIG. 1.

As shown in step S101 of FIG. 3, before the occurrence of the event shown in FIG. 6, the vehicles m1 to m3 are executing the delivery function in cooperation with the common server 10.

As shown in FIG. 6, when a traffic accident occurs at the intersection surrounded by the buildings 81, 82, 84, and the park 85, the event information server 20 outputs, as event occurrence information, accident occurrence information including situation information of the traffic accident and occurrence position information of the traffic accident.

Figure 7:
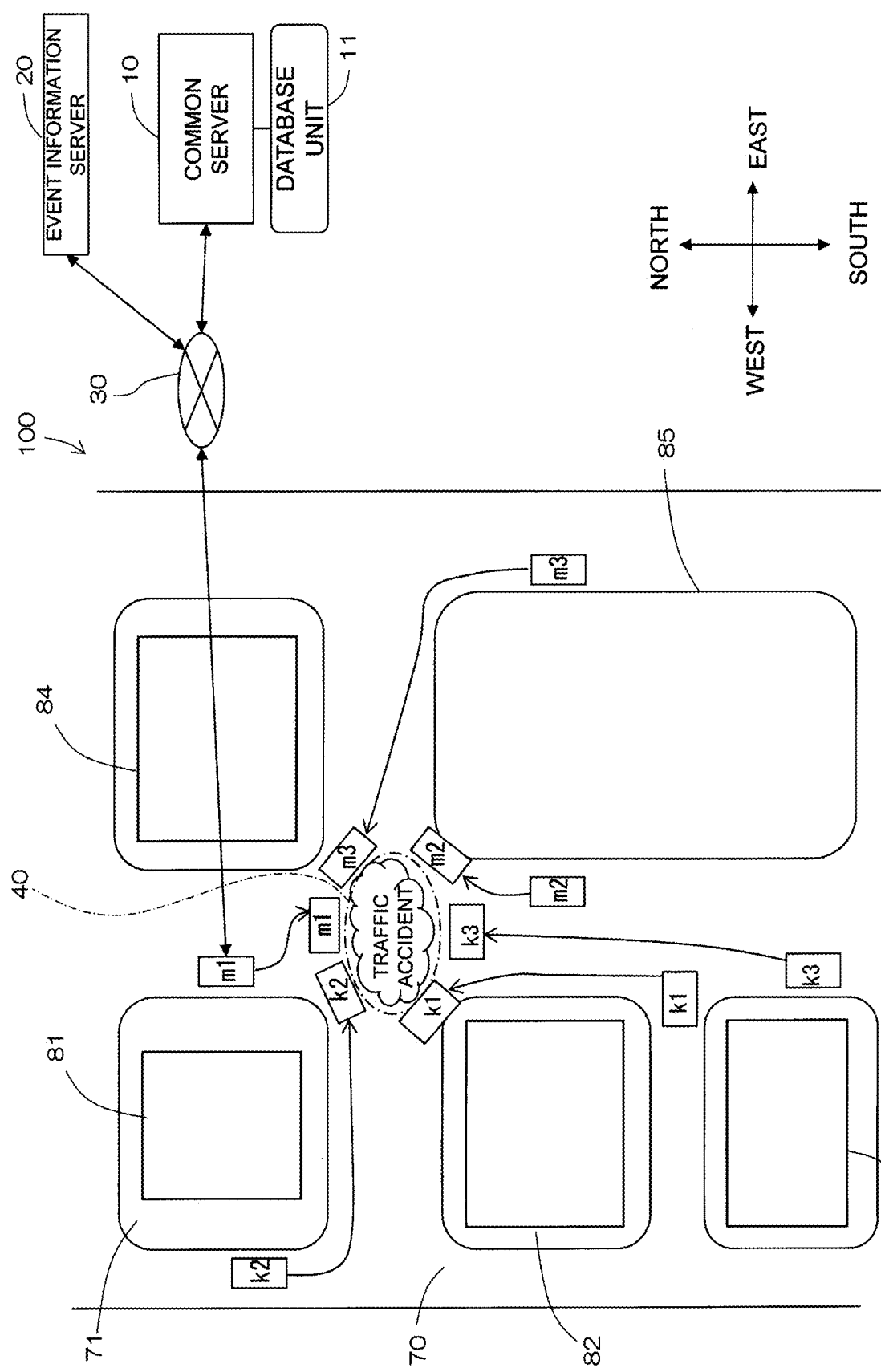
FIG. 7 is a top plan view showing a state where a regulation line is formed with a plurality of vehicles of the vehicle management system shown in FIG. 1.

When the traffic accident occurs, the event information server 20 outputs, as the event occurrence information, the accident occurrence information including the situation information of the traffic accident and the occurrence position information of the traffic accident. Upon receiving the event information in step S102 of FIG. 3, the vehicles m1 to m3 shift to step S103 of FIG. 3 to compare the priority of the function corresponding to the event occurrence information with the priority of the delivery function the vehicles m1 to m3 are currently executing. When the event is a traffic accident, the priority of the function corresponding to the traffic accident is higher than the priority of the delivery function currently being executed. Therefore, the vehicles m1 to m3 determine "YES" in step 103 of FIG. 3 and shift to step S104 of FIG. 3 to form a regulation line 40 around the site of the accident as the event dealing function as shown in FIG. 7. Details of forming the regulation line 40 will be described later.

Similarly, upon receiving the even occurrence information in step S102 of FIG. 3, the vehicles k1 to k3 executing the housework service function before the occurrence of the event compare, in step S103 of FIG. 3, the priority of the function corresponding to the event occurrence information with the priority of the housework service function that the vehicles k1 to k3 are currently executing. When the event is a traffic accident, the priority of the function corresponding to the traffic accident is higher than the priority of the housework service function currently being executed. Therefore, the vehicles k1 to k3 determine "YES" in step 103 of FIG. 3 and shift to step S104 of FIG. 3 to form the regulation line 40 around the site of the accident as the event dealing function as shown in FIG. 7 as in the case of the vehicles m1 to m3.

In step S104 of FIG. 3, the vehicles m1 to m3 and the vehicles k1 to k3 located in the vicinity of the intersection where the accident has occurred receive the map data of the vicinity of the intersection from the common server 10, so that the vehicles m1 to m3 and the vehicles k1 to k3 autonomously travel toward the intersection where the traffic accident has occurred as shown in FIG. 7 based on the event occurrence information received from the event information server 20. At this time, each of the vehicles m1 to m3 and vehicles k1 to k3 may autonomously travel while checking the mutual positions by communicating with each other. Then, the vehicles m1 to m3 and the vehicles k1 to k3 stop to circle around the site of the accident to form the regulation line 40. For example, the regulation line 40 may be formed by making a continuous wall by stopping the vehicles m1 to m3 and k1 to k3 closely in the front-and-rear direction, or the regulation line 40 may be formed as an intermittent wall by putting the vehicles 50 into some groups and placing each of the groups with a space provided therebetween in the front-and-rear direction. Further, a laser beam or the like may be irradiated between the vehicles m1 to m3 and vehicles k1 to k3 stopped in front and rear to form part of the regulation line 40 with the laser beam. Thereby, pedestrians and the like do not enter the site of the accident, so that it is possible to suppress occurrence of secondary accidents.

Figure 8:
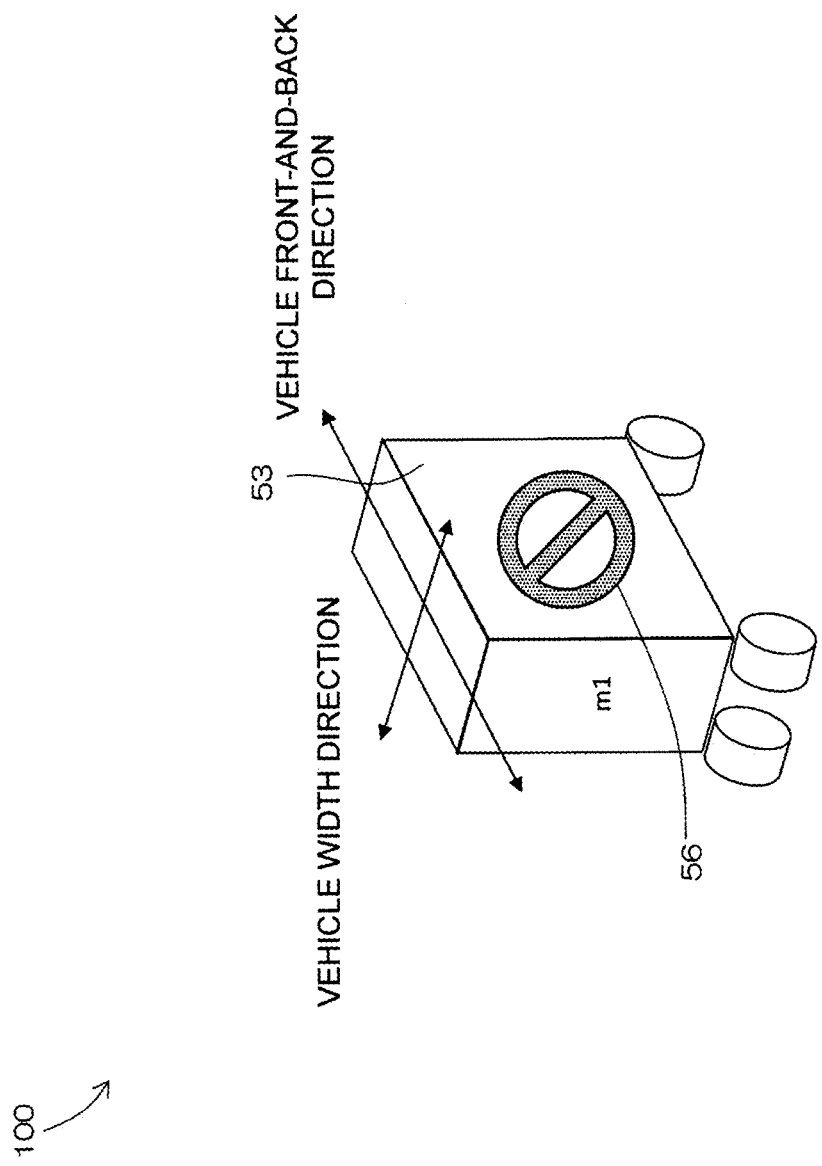
FIG. 8 is an explanatory diagram showing a sign displayed on a side face of the vehicle of the vehicle management system shown in FIG. 1 when forming the regulation line.

Further, as shown in FIG. 8, each of the vehicles m1 to m3 and vehicles k1 to k3 may display a sign indicating "keep out" as a sign 56 indicating a regulated area.

In the vehicle management system 100 described heretofore, each of the vehicles m1 to m3 and vehicles k1 to k3 determines whether or not the priority of the function corresponding to the event occurrence information is higher than the priority of each function being executed by the vehicles m1 to m3 and vehicles k1 to k3 and, when determining that the priority of the function corresponding to the event occurrence information is higher than the priority of each function, each of the vehicles m1 to m3 and vehicles k1 to k3 autonomously travels and executes the same function corresponding to the event occurrence information. Therefore, when a traffic accident or the like occurs, it is possible to simultaneously gather a large number of vehicles 50 around the site of the accident and form the regulation line 40 in a short time so as to instantly deal with the occurrence of the event.

In the example described above, before the occurrence of the event the vehicles m1 to m3 are executing the delivery function and the vehicles k1 to k3 are executing the housework service function. Thus, the priority of the function corresponding to the accident occurrence information is higher than the priorities of those functions, so that all of the vehicles m1 to m3 and the vehicles k1 to k3 start to execute the same event dealing function. However, inversely, there may also be a case where the priority of the function the vehicles 50 are currently executing is higher than the priority of event dealing function so that the event dealing function is not executed. For example, when the vehicle 50 at a place distant from a site of an accident mutually communicates with the vehicle 50 located in the vicinity of the site of the accident and determines that the regulation line 40 can be formed by the vehicles 50 located around the site of the accident, the vehicle 50 distant from the site of the accident determines that the priority of the function being executed is higher than that of the event dealing function; that is, determines "NO" in step S103 of FIG. 3, and continues executing the current function.

In the explanation above, each of the vehicles 50 determines the priority between each of the functions being executed and the event dealing function. However, for example, the common server 10 may determine the priority between the functions being executed by each of the vehicles 50 and the event dealing function.

Hereinafter, operations of the common server 10 and other operations of the vehicle 50 when an event occurs will be described by referring to FIG. 4 and FIG. 5.

Figure 4:
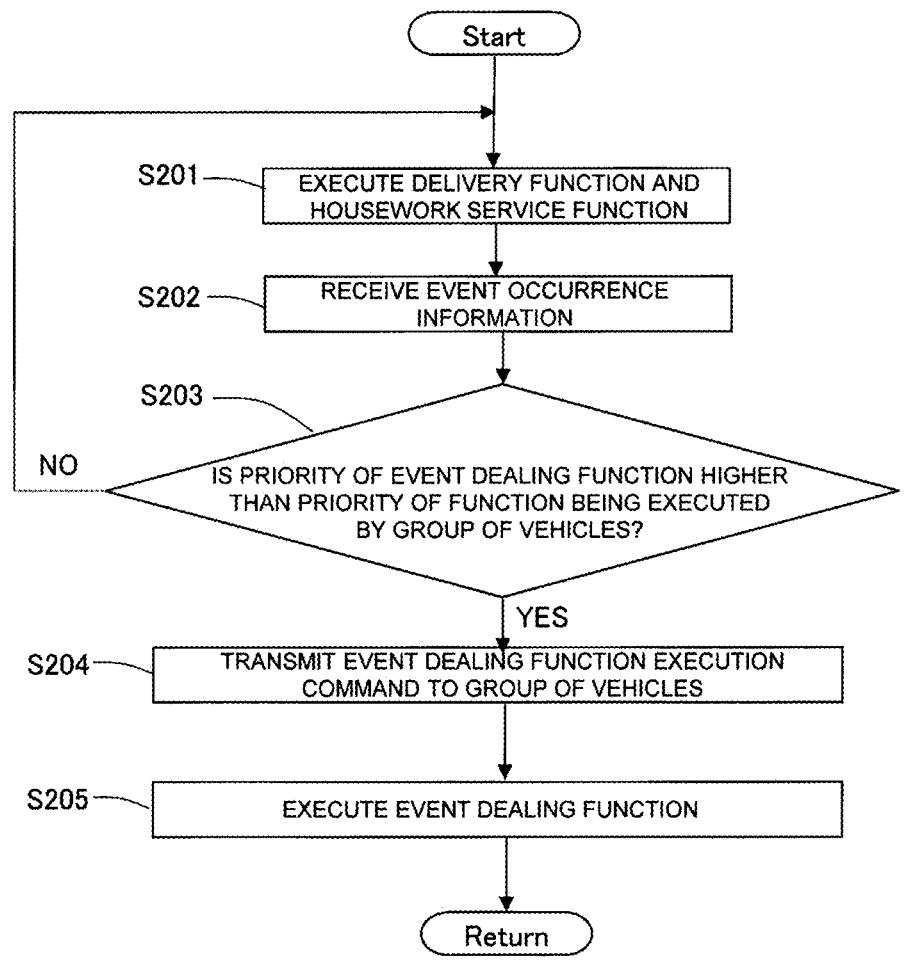
FIG. 4 is a flowchart showing operations of a common server of the vehicle management system according to the embodiment shown in FIG. 1.

As shown in step S201 of FIG. 4, before the occurrence of an event, the common server 10 is executing the delivery function in cooperation with the vehicles m1 to m3 and executing the housework service function in cooperation with the vehicles k1 to k3. Upon receiving event information in step S202 of FIG. 4, the common server 10 shifts to step S203 of FIG. 4. In step S203 of FIG. 4, the common server 10 compares the priority of the function currently being executed by a group of vehicles with the priority of the function corresponding to the event occurrence information. Note here that a group of vehicles is a plurality of vehicles 50 executing the same function before the occurrence of the event, which are the vehicles m1 to m3 executing the delivery function or the vehicles k1 to k3 executing the housework service function. The common server 10 compares the priority of the delivery function that the vehicles m1 to m3 are executing with that of the function corresponding to the event occurrence information. Further, the common server 10 compares the priority of the housework service function the vehicles k1 to k3 are executing with that of the function corresponding to the event occurrence information. As has been described, when the event is a traffic accident, the priority of the function corresponding to the event occurrence information is higher than the priorities of the delivery function and the housework service function. Thus, the common server 10 determines "YES" in step S203 of FIG. 4 for each group of the vehicles m1 to m3 and the vehicles k1 to k3, shifts to step S204 of FIG. 4 to transmit an event dealing function execution command to each of the vehicles m1 to m3 and vehicles k1 to k3, and shifts to step S205 of FIG. 4.

Then, in step S205 of FIG. 4, the common server 10 cooperates with the vehicles m1 to m3 and the vehicles k1 to k3 to form the regulation line 40 around the site of the accident as the event dealing function corresponding to the accident occurrence information.

Figure 5:
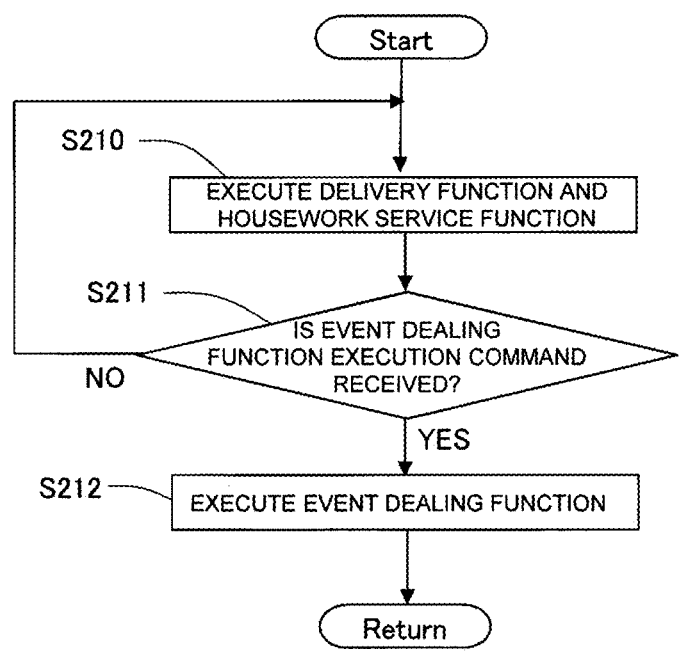
FIG. 5 is a flowchart showing further operations of the vehicle of the vehicle management system according to the embodiment shown in FIG. 1.

In the meantime, upon receiving the event dealing function execution command from the common server 10, the vehicles m1 to m3 and the vehicles k1 to k3 determine "YES" in step S211 of FIG. 5, shift to step S212 of FIG. 5 to stop executing the delivery function and the housework service function and, based on the map information and the event occurrence information received from the common server 10, form the regulation line 40 around the site of the accident in the same manner as that described above as the event dealing function corresponding to the accident occurrence information by cooperating with the common server 10.

When determining that the priority of the function being executed by the group of vehicles 50 is higher than the priority of the event dealing function, the common server 10 determines "NO" in step S203 of FIG. 4, and returns to step S201 of FIG. 4 without transmitting the event dealing function execution command to the group of vehicles 50 to continue executing the current function. For example, when determining that it is possible to form the regulation line 40 with the vehicles 50 located in the vicinity the site of the accident, the common server 10 determines that the priority of the function being executed by the group of vehicles 50 located at the places distant from the site of the accident is higher than that of the event dealing function, and returns to step S201 of FIG. 4 without transmitting the event dealing function execution command to continue the function that is being executed.

As for the operation of the vehicle management system 100 described heretofore, like the operations of the vehicles 50 described above, each of the vehicles m1 to m3 and k1 to k3 executes the same function corresponding to the event occurrence information when the priority of the function corresponding to the event occurrence information is higher than the priority of each function being executed by the vehicles m1 to m3 and the vehicles k1 to k3. Therefore, when a traffic accident or the like occurs, it is possible to simultaneously gather a large number of vehicles 50 around the site of the accident and to instantly deal with the occurrence of the event.

Further, in such operation, each of the vehicles 50 executes the function corresponding to the event occurrence information based on the information from the common server 10 that includes the map information database 12. Therefore, even when there are no vehicles 50 around the site of the accident, for example, it is possible to execute a more complicated function such as gathering the vehicles 50 located at places distant from the site of the accident around the site of the accident to form the regulation line 40.

While the embodiment above describes forming the regulation line 40 around the site of the accident as the function corresponding to the event occurrence information, it is also possible to execute functions other than that. For example, for event occurrence information indicating that a bridge is damaged, a plurality of vehicles may be lined up to construct a bridge. Further, for event occurrence information indicating that there is a missing person, a plurality of vehicles may search for the missing person. Furthermore, for event occurrence information indicating that there is a traffic light failure, the traffic may be controlled by a plurality of vehicles 50, or the displays thereof may be used as the signals.

The invention claimed is:

1. A vehicle management system, comprising:
a plurality of vehicles that execute different functions;
an event information server that transmits event occurrence information; and
a common server that includes a map information database, wherein
the plurality of vehicles execute the same function corresponding to the event occurrence information, when a priority of a function corresponding to the event occurrence information received from the event information server is higher than a priority of each function currently being executed,
the plurality of vehicles travel autonomously while communicating with the common server;
the common server outputs an event dealing function execution command to execute a function corresponding to the event occurrence information to, among the plurality of vehicles, a group of vehicles whose currently executing function is lower in the priority than the priority of the function corresponding to the event occurrence information received from the event information server; and
upon receiving the event dealing function execution command from the common server, the group of the vehicles executes the function corresponding to the event occurrence information based on map information and the event occurrence information received from the common server.

2. The vehicle management system according to claim 1, wherein:
- when the event occurrence information received from the event information server is accident occurrence information of an accident, the common server outputs the event dealing function execution command to execute a function corresponding to the accident occurrence information to, among the plurality of vehicles, a further group of vehicles; and
- upon receiving the event dealing function execution command from the common server, the further group of the vehicles travel autonomously based on the map information and the event occurrence information received from the common server and form a regulation line around a site of the accident.

3. The vehicle management system according to claim 2, wherein the plurality of vehicles stop around the site of the accident to form the regulation line.

4. The vehicle management system according to claim 2, wherein:
- each of the plurality of vehicles comprises a display on an outer face; and
- a sign indicating a regulated area is displayed on each of the displays.

* * * * *